United States Patent Office 2,948,694
Patented Aug. 9, 1960

2,948,694

VINSOL-EPOXY COMPOSITIONS

Francis E. Reed, Louisville, Ky., assignor to Devoe & Raynolds Company, Inc., a corporation of New York No Drawing. Filed Nov. 10, 1958, Ser. No. 772,733

10 Claims. (Cl. 260—24)

The present invention in one aspect relates to new epoxide resin compositions. In another of its aspects the invention relates to coating compositions which can be used in the coating of metals, for instance can coatings and the like. In another aspect very satisfactory laminates are prepared using the epoxide resin composition of the invention. In still another aspect the coatings are suited for coating wires, particularly electrical wires.

The particularly economical epoxide resin compositions of this invention are liquid mixtures of epoxide resins, more specifically ethoxyline resins, with a natural resin known to the trade as Vinsol. Vinsol is a trademark of Hercules Powder Company for a hard, brittle, non-tacky, high-melting, thermoplastic material which appears black in reflected light and which is ruby red when viewed by transmitted light through thin sections. It is an extract of pine wood, such as southern pine, particularly the stump, and is comprised of a complex mixture of acidic materials derived from rosin acids and oxidized rosin acids, neutral high molecular weight compounds, and acidic phenolic materials in the form of substituted phenolic ethers, polyphenols, and other high molecular weight phenols. It is gasoline-insoluble and aromatic hydrocarbon-soluble; is saponifiable and esterifiable with polyhydric alcohols; and has an acid number of 90 to 105. Typical analysis values for it are: saponification number 165; methoxyl ($-OCH_3$) content (ASTM or AOAC) percent 5.3; density (at 25° C.) 1.218; softening point 110° C. minimum, 125° C. maximum; gasoline soluble, 20 percent maximum; and toluene insoluble, 25 percent maximum.

Epoxide resins with which this invention is concerned include monomeric, or straight chain polymeric epoxy ethers, esters and oils having molecular weights of 250 to 8000. Particularly suited are the ethoxyline resins. The term "ethoxyline resin" denotes the well known resins prepared by the condensation of an epihalohydrin with a polyhydric alcohol or phenol with subsequent dehydrohalogenation using a caustic alkali. The term also includes high molecular weight epoxide resins prepared by reacting low molecular weight ethoxyline resins with polyhydric phenols. Thus, as well known in the art, ethoxyline resins are made by condensing glycerol dichlorohydrin or epichlorhydrin with ethylene glycol, diethylene glycol, glycerol, diglycerol, catechol, resorcinol, a tri-hydroxybnezene, a di(hydroxyphenyl)methane, a di(hydroxyphenyl)ethane, a di(hydroxyphenyl)propane, dihydroxydiphenyl sulfone, etc.

U.S. Patents 2,581,464; 2,582,985; 2,615,007; 2,615,008; 2,698,315; and 2,731,444 describe examples of ethoxyline resin compositions which can be employed in the practice of this invention. By reference the aforementioned patents are intended to be included as a part of the present description of the ethoxyline resins, and for brevity the ethoxyline resin will not be described other than as a polyether having terminal epoxide groups on vicinal carbon atoms, and a weight per epoxide group of 140 to 4000.

Not only is Vinsol a solid, but most of the ethoxyline resins also are solids. Accordingly, in carrying out this invention it is generally the practice to combine the two using one or more solvents as a vehicle, sufficient solvent being used to give the desired consistency to the Vinsol-epoxide composition. Thus a solution of Vinsol in xylene is mixed with a solution of an ethoxyline resin in methyl isobutyl ketone. It is known that Vinsol is soluble in a solvent at least as strong as aromatic hydrocarbons, such as xylene, toluene, or benzene. Mixtures of solvents can also be used.

Epoxide resins require a stronger solvent than does Vinsol, that is a solvent with a greater solvency power for organic compounds, particularly polymers. Suitable ethoxyline resin solvents are the known oxygenated solvents, such as ketones, esters, alcohols and ethers, for instance methyl isobuytl ketone, acetone, butanol, ethyl acetate, butyl acetate and the diethyl ether of ethylene glycol. If it is desired to have the same solvent in each solution, or if it is desired to dissolve first the Vinsol and then the ethoxyline resin, or vice versa, in one solvent, an oxygenated solvent should be used.

In addition to the Vinsol, the ethoxyline resin and the vehicle, the compositions of this invention can contain agents for more rapid setting or curing of the coating. The agents which effect cross-linking in the ethoxyline resin are desirable and include polyfunctional primary, secondary or tertiary amines such as ethylene diamine, diethylene triamines, tetraethylene pentamine, diethyl amine, and the tri(dimethylamino methyl) phenols. However, organic acids, amine salts, amides and $BF_3$ complexes can be used, for example phthalic acid or anhydride, dicyandiamide, and $BF_3$ monoethylamine. Urea, melamine and phenol-formaldehyde resins can also be used as cross-linking agents. The cross-linking agents can be used in various amounts although they are usually employed in the range of 0.05 to 10 percent by weight based on the total composition. The amount of cross-linking agent necessary generally depends upon the particular agent. Thus anhydrides and urea-aldehyde resins are generally used in greater quantities within the above range than the amines or quaternary ammonium salts. More than optimum amounts can, of course, be used but there will be no particular advantage in so doing.

Many cross-linking agents react with epoxide resins at room temperature. Accordingly the temperatures at which films or laminates of the Vinsol-epoxide are cured depend upon the cross-linking agent. Temperatures will range from 40° F. to 450° F. Films of the composition of the invention are generally cured at 350° F. to 400° F. It is obvious that if the curing of the composition occurs at room temperature when certain cross-linking agents are employed the Vinsol-epoxide mixture and the cross-linking agent should be made up as a two-component system, the cross-linking agent being added just prior to use.

The quantity of Vinsol admixed with epoxide resin and if desired filler and vehicle can be varied widely depending on desired properties. Thus, compositions of the invention comprise 5 to 40 parts Vinsol and 95 to 60 parts epoxide resin based on 100 parts by weight of the Vinsol-epoxide content. Solvents, diluents and the like are incorporated in amounts sufficient to reduce the viscosity to a workable consistency. Pigments if employed are used in accordance with known methods.

The invention is further illustrated by the following specific data and examples. It is understood, however, that the examples are for the purposes of illustration and are not intended to limit the invention. In the table and examples the epoxide resins will be designated by letter, e.g. Epoxide A, the resins being described in the following table. The table shows the ratio of epichlorhydrin to bisphenol used to prepare the epoxide resins and gives the epoxide equivalency of the epoxides used.

| Epoxide | Ratio | | Epoxide Equivalent |
|---|---|---|---|
| | Epichlorohydrin | Bisphenol | |
| A | 10 | 1 | 190 |
| B | 4.48 | 2.85 | 475 |
| C | 1.22 | 1 | 920 |
| D | 100 parts of Epoxide C plus 5 parts of Bisphenol. | | 1900 |
| E | 100 parts of Epoxide C plus 7.75 parts of Bisphenol. | | 3500 |

Films prepared in the following examples were tested for hardness, impact resistance, conical mandrel bend, adhesion, and boiling water resistance.

The ratings of each test appearing in the examples or tables are as follows:

IMPACT TEST

Rating of 10—No failure 80 inch lb.
Rating of 1—Film striated by cracks but not removed from steel on 10 inch lb. impact.
Rating of 0—Film removed by 10 inch lb. impact.

CONICAL BEND

Rating of 10—No cracking for total width of panel.
Rating of 7–8—Film cracked a distance of 1½ inches.
Rating of 4—Film cracked a distance of 2½ inches.
Rating of 0—Film flaked from steel across the bend.

ADHESION—KNIFE SCRATCH

These are rated comparatively based on a rating of zero (0) as the type of adhesion that allows a film to strip or flake off ahead of the knife edge or be removed with practically no resistance.

Example 1

To 42.31 parts of a 100 percent non-volatile liquid epoxide resin A are added 37.95 parts of a Vinsol solution, in which 60 parts of Vinsol are dissolved in a mixture of 13.5 parts of methyl isobutyl ketone, 13.5 parts of n-butanol and 13 parts of xylene. To this epoxide-Vinsol mixture are added 14.32 parts of a solution of a $BF_3$ monoethylamine complex made by dissolving 2 parts of the $BF_3$ complex in a mixture of 6.10 parts of xylene, 5.80 parts of n-butyl acetate, 2.10 parts of methyl ethyl ketone, and 5.40 parts of methyl isobutyl ketone. Also added are 5.42 parts of a butylated urea-formaldehyde resin made by dissolving 60 parts of the urea-formaldehyde resin in a mixture of 35 parts of butanol and 5 parts of xylene. Films are prepared by spraying the resulting solution onto 24 gauge, No. 160 Bonderized steel panels to form a 2.0 mil film. The films after being cured by baking thirty minutes at 350° F. have the following properties: pencil hardness, 6–H; impact resistance, 10; resistance to conical mandrel bend, 10; resistance to knife scratching, 4; and good resistance to boiling water. The films after being cured by baking fifteen minutes at 400° F. exhibited pencil hardness, 5–H; impact resistance, 10; resistance to conical mandrel bend, 10; resistance to knife scratching, 4; and good resistance to boiling water.

Example 2

In accordance with Example 1, 61.26 parts of a resin solution made by dissolving 75 parts of epoxide resin B in 25 parts of a mixture made up of 16.25 parts of methyl isobutyl ketone and 8.75 parts of xylene are added to 32.83 parts of a Vinsol solution prepared as in Example 1. To this resulting mixture are added 5.91 parts of 2,4,6-tri(dimethyl amino methyl)phenol. Films prepared as in Example 1 after being cured by baking thirty minutes at 300° F. have the following properties: pencil hardness, 5–H; impact resistance, 10; resistance to conical mandrel bend, 10; resistance to knife scratching, 4; and good resistance to boiling water.

Example 3

In the manner described in Example 1, 58.04 parts of epoxide resin B solution prepared as in Example 2 are added to 8.13 parts of a Vinsol solution prepared according to Example 1. To this resulting mixture are added 29.80 parts of a methylene dianiline solution made by dissolving 5.8 parts of methylene dianiline in a mixture of 7.25 parts of n-butyl acetate, 3.375 parts of methyl ethyl ketone, 6.75 parts of methyl isobutyl ketone, and 7.625 parts of xylene. Also added are 4.03 parts of the butylated urea-formaldehyde resin described in Example 1. Films prepared according to Example 1 after being cured by baking thirty minutes at 300° F. have: a pencil hardness of 4–H; an impact resistance of 10; a resistance to a conical mandrel bend of 10; a resistance to knife scratching of 5; and good resistance to boiling water.

Example 4

Following Example 1, 33.25 parts of a 100 percent non-volatile liquid epoxide resin A are added to 2.92 parts of a Vinsol solution prepared as in Example 1. To this resulting mixture are added 63.83 parts of a dicarboxylic anhydride solution made by dissolving 50 parts of 1,4,5,6,7,7 - hexachlorobicyclo - (2,2,1)-5-heptene-2,2-dicarboxylic anhydride in 25 parts of toluene and 25 parts of isopropyl alcohol. Films are prepared as described in Example 1. The films are cured by baking fifteen minutes at 400° F., producing a hard, tough film.

Example 5

In accordance with Example 1, 26.23 parts of a 100 percent non-volatile liquid epoxide A are added to 23.75 parts of a Vinsol solution prepared according to Example 1. To this resulting mixture are added 50.20 parts of the 1,4,5,6,7,7-hexachlorobicyclo-(2,2,1)-5-heptene-2,3-dicarboxylic anhydride prepared in Example 4. Films are prepared as outlined in Example 1. The film is cured by baking fifteen minutes at 400° F., producing a hard tough film.

Example 6

Following the procedure of Example 1, 55.08 parts of a resin solution made by dissolving 65 parts of epoxide resin C in 35 parts of methyl isobutyl ketone are added to 23.58 parts of the Vinsol solution described in Example 1. To this resulting mixture are added 16.62 parts of the 1,4,5,6,7,7 - hexachlorobicyclo(2,2,1)-5-heptene-2,3-dicarboxylic anhydride prepared in Example 4. Also added are 4.72 parts of the butylated urea-formaldehyde resin. Films are prepared as in Example 1. The film is cured by baking fifteen minutes at 400° F., producing a hard film showing strong resistance to boiling water and knife scratching.

Example 7

According to the procedure of Example 6, 73.92 parts of epoxide resin C are added to 20.07 parts of the Vinsol solution described in Example 1. To this resulting mixture is added 1 part of a quaternary ammonium compound, made by dissolving 40 parts of benzyl tri-methyl ammonium methoxide in 60 parts of methanol. Also added are 5.01 parts of the butylated urea-formaldehyde resin described in Example 1. Films prepared in accordance with Example 1 and cured by baking thirty minutes at 350° F. are hard films showing good resistance to boiling water and knife scratching, and having a pencil hardness of 4–H.

Properties of other films prepared according to the foregoing examples are best shown in Table A, the film forming compositions being prepared from the following

TABLE A

| Composition | Curing to °F. | Pencil hardness | Impact resistance | Conical mandrel bend | Adhesion knife scratch | Boiling water test |
|---|---|---|---|---|---|---|
| a | 30' @ 300 | 4-H | 1 | 1 | 4-5 | 172 hrs—Isolated pin points and slight bloom. |
| a | 30' @ 350 | 4H-5H | 1 | 10 | 4 | 172 hrs—Isolated pin points and slight bloom. |
| a | 15' @ 400 | 4H | 1 | 10 | 4 | 172 hrs—Isolated pin points and slight bloom. |
| b | 15' @ 400 | 5H | 10 | 10 | 4-5 | 148 hrs—Scattered pin points and rust points, slight bloom. |
| b | 30' @ 350 | 4H | 10 | 7-8 | 4-5 | 148 hrs—Scattered pin points and rust points, slight bloom. |
| c | 15' @ 400 | 6H | 10 | 10 | 7 | 148 hrs—Scattered pin points and rust points, very slight bloom. |
| c | 30' @ 350 | 6H | 10 | 10 | 7 | 148 hrs—Isolated pin points and rust points, very slight bloom. |
| d | 15' @ 400 | 6H | 10 | 10 | 6-7 | 148 hrs—Scattered pin points and rust points, very slight bloom and dulling. |
| d | 30' @ 350 | 6H | 10 | 10 | 6-7 | 148 hrs—Scattered pin points and rust points, very slight bloom and dulling. |
| e | 30' @ 300 | 4H | 10 | 10 | 6 | 148 hrs—Isolated pin points, rust points, definite bloom, slight dulling. |
| e | 30' @ 350 | 5H | 1 | 10 | 4-5 | 148 hrs—Isolated pin points, rust points, definite bloom, slight dulling. |
| e | 15' @ 400 | 6H | 1-2 | 10 | 4-5 | 148 hrs—Isolated pin points, rust points, pronounced bloom, slight dulling. |
| f | 30' @ 300 | 4H | 1 | 4 | 5 | 76 hrs—Isolated pin points, rust points, definite bloom and line checking. |
| g | 15' @ 400 | 2H-3H | 1 | 1 | 4 | 76 hrs—Generally fine pin points, rust points, pronounced bloom, dull, checking. |
| g | 30' @ 350 | 2H | 1 | 1 | 4 | 52 hrs—Generally fine pin points, rust points, definite bloom, pronounced dulling, checking. | reactants, the parts being by weight on a solution basis rather than a solids basis if a solution is used.

Composition a:                                                       Parts
 Epoxide C solution of Example 6 _____ 64.33
 Vinsol solution of Example 1 _____ 23.24
 Dimethyl formamide _____ 11.15
 Tetraethylene pentamine _____ 1.28

Composition b:
 Solution made by dissolving 40 parts of epoxide D in 60 parts of ethylene glycol monoethly ether acetate _____ 73.60
 Vinsol solution of Example 1 _____ 12.30
 Monoallyl ether of dimethylol phenol _____ 11.03
 The butylated urea-formaldehyde resin of Example 1 _____ 3.07

Composition c:
 Epoxide D solution of composition b _____ 63.02
 Vinsol solution of Example 1 _____ 14.01
 50 percent solids phenol-formaldehyde resin _ 20.17
 The butylated urea-formaldehyde resin of Example 1 _____ 2.80

Composition d:
 Epoxide D solution of composition b _____ 77.57
 Vinsol _____ 9.13
 A melamine-formaldehyde resin in which 55 parts of the resin is dissolved in a mixture made up of 25.2 parts of butanol and 19.8 parts of xylene _____ 13.30

Composition e:
 Solution made by dissolving 40 parts of epoxide E in 60 parts of a mixture made up of 19.98 parts of ethylene glycol monoethyl etheracetate, 15 parts of amyl alcohol, 10.02 parts of ethylene glycol monobutyl ether and 15 parts of xylene _____ 76.38
 Vinsol solution of Example 1 _____ 8.99
 Dimethyl formamide _____ 14.38
 Tetraethylene pentamine _____ .25

Composition f:
 Epoxide E solution of composition c _____ 42.27
 Vinsol solution of Example 1 _____ 37.65
 Epoxide A _____ 16.91
 2,4,6-tri(dimethyl amino methyl)phenol ____ 3.16

Composition g:                                                       Parts
 Epoxide B solution of Example 2 _____ 45.53
 Vinsol solution of Example 1 _____ 24.37
 A dicarboxylic anhydride solution made by dissolving 50 parts of 1,4,5,6,7,7-hexachlorobicyclo - (2,2,1)-5-heptene-2,3-dicarboxylic anhydride in 50 parts of a mixture made up of 25 parts of toluene and 25 parts of isopropyl alcohol _____ 26.03
 The butylated urea-formaldehyde resin of Example 1 _____ 4.07

As shown by the foregoing examples excellent films result from operation in accordance with this invention. Very satisfactory laminates are also possible according to the practice of this invention as shown in the following example.

Example 8

A pre-preg is prepared by impregnating glass cloth (Volan A–181) with a mixture of 25 parts Vinsol and 75 parts epoxide resin A. The Vinsol is employed as a 35 percent solution in acetone and the epoxide resin is employed as a 75 percent solution in methyl isobutyl ketone. The pre-impregnated glass cloth is then heated at 285° F. for twenty minutes to drive out the solvents. A laminate is then prepared by curing twelve plies of the pre-preg for thirty minutes at 340° F. and a pressure of 200 lbs. per square inch. The laminates which are then post cured for two hours at 400° F. exhibit the following flexural strengths (ASTM D790-49T): 81,464 p.s.i. at 72° F.; 72,321 p.s.i. at 150° F.; and 23,103 p.s.i. at 200° F. A similarly prepared and post cured laminate without the Vinsol has the following flexural strengths: 80,784 p.s.i. at 72° F.; 68,545 p.s.i. at 150° F.; and 43,740 p.s.i. at 200° F. Similarly determined flexural strengths of laminates containing 35 percent Vinsol, as well as room temperature-determined flexural strengths of 25 percent and 35 percent Vinsol laminates, show 25 percent Vinsol to be about the optimum level insofar as physical properties of laminates are concerned.

It is understood that while glass cloth is used in the example the invention is not limited thereto, but to other laminates as well, for example glass, wood, paper, asbestos and the like. It is noted also that the compositions of the invention can contain pigments, fillers and other additives depending upon their ultimate use. Other modifications or variations will also occur to one skilled in the art and such modifications can be made without departing from the spirit and scope of this invention.

What is claimed is:

1. A composite article comprising at least two elements adhered together by a thin layer of a cured composition containing as its sole reactive ingredients Vinsol, a dark colored, hard, pine resin which is soluble in aromatic hydrocarbons, substantially insoluble in petroleum hydrocarbons and has an acid number of 90 to 105, and an ethoxyline resin selected from the group consisting of monomeric and straight chain polymeric epoxy ethers, esters and oils having molecular weights of 250 to 8,000, and at least one of the ethoxyline resin cross-linking agents, urea and melamine aldehyde resins, amines, amides, boron trifluoride amine complexes and polycarboxylic anhydrides.

2. A wire coated with a cured composition containing as its sole reactive ingredients Vinsol, a dark colored, hard, pine resin which is soluble in aromatic hydrocarbons, substantially insoluble in petroleum hydrocarbons and has an acid number of 90 to 105, and an ethoxyline resin selected from the group consisting of monomeric and straight chain polymeric epoxy ethers, esters and oils having molecular weights of 250 to 8,000, and at least one of the ethoxyline resin cross-linking agents, urea and melamine aldehyde resins, amines, amides, boron trifluoride amine complexes and polycarboxylic anhydrides.

3. A coating composition containing as its sole reactive ingredients Vinsol, a dark colored, hard, pine resin which is soluble in aromatic hydrocarbons, substantially insoluble in petroleum hydrocarbons and has an acid number of 90 to 105, and an ethoxyline resin selected from the group consisting of monomeric and straight chain polymeric epoxy ethers, esters and oils having molecular weights of 250 to 8,000, and at least one of the ethoxyline resin cross-linking agents, urea and melamine aldehyde resins, amines, amides, boron trifluoride amine complexes and polycarboxylic anhydrides wherein the Vinsol is present in an amount of 5 percent to 40 percent of the Vinsol-ethoxyline resin mixture.

4. The coating composition of claim 3 wherein the cross-linking agent is an amine.

5. The coating composition of claim 3 wherein the cross-linking agent is an amide.

6. The coating composition of claim 3 wherein the cross-linking agent is a boron trifluoride amine complex.

7. The coating composition of claim 3 wherein the cross-linking agent is a polycarboxylic acid anhydride.

8. The coating composition of claim 3 wherein the cross-linking agent is an urea-formaldehyde resin.

9. The coating composition of claim 3 including a polar solvent.

10. The composition of claim 9 comprising from 95 to 75 parts of a glycidyl polyether of a polyhydric phenol having an epoxy equivalency greater than one; 5 to 25 parts Vinsol based on 100 parts by weight of Vinsol-polyether content, Vinsol comprising a dark colored, hard, pine resin which is soluble in aromatic hydrocarbons, substantially insoluble in petroleum hydrocarbons, and has an acid number of 90 to 105; from 0.1 to 10 percent of said cross-linking agent based on the Vinsol-polyether component; and sufficient solvent to give the desired consistency to said composition.

References Cited in the file of this patent

UNITED STATES PATENTS

| 2,732,367 | Shokal | Jan. 24, 1956 |
| 2,856,094 | Gloyer et al. | Oct. 14, 1958 |

FOREIGN PATENTS

| 522,867 | Canada | Mar. 20, 1956 |

OTHER REFERENCES

Austin: Epoxy Modified Rosin Esters, Paint Oil and Chem. Rev., pages 15–17, 35–37, vol. 117, No. 11, June 1954.